United States Patent
Brown

(10) Patent No.: US 11,330,937 B2
(45) Date of Patent: May 17, 2022

(54) MODULAR SMOKER ASSEMBLY

(71) Applicant: Arthur Brown, Houston, TX (US)

(72) Inventor: Arthur Brown, Houston, TX (US)

(*) Notice: Subject to any disclaimer, the term of this patent is extended or adjusted under 35 U.S.C. 154(b) by 79 days.

(21) Appl. No.: 16/747,248

(22) Filed: Jan. 20, 2020

(65) Prior Publication Data

US 2021/0219779 A1    Jul. 22, 2021

(51) Int. Cl.
    *A47J 37/07*    (2006.01)

(52) U.S. Cl.
    CPC .......... *A47J 37/0704* (2013.01); *A47J 37/07* (2013.01); *A47J 37/0763* (2013.01)

(58) Field of Classification Search
    CPC ..... A47J 37/0704; A47J 37/07; A47J 37/0763
    See application file for complete search history.

(56) References Cited

U.S. PATENT DOCUMENTS

| | | | | |
|---|---|---|---|---|
| 4,512,249 A * | 4/1985 | Mentzel | ............... | A47J 37/0704 126/25 R |
| 4,724,756 A | 2/1988 | Sarparanta | | |
| 4,962,697 A * | 10/1990 | Farrar | ............... | A47J 37/0704 126/25 R |
| 5,768,977 A * | 6/1998 | Parris | ............... | A47J 37/0704 126/25 R |
| 6,543,435 B1 * | 4/2003 | Regen | ............... | A47J 37/0704 126/25 R |
| 7,150,278 B1 * | 12/2006 | Hampton | ............... | A47J 37/0713 126/38 |
| 7,861,705 B2 * | 1/2011 | Hulsey | ............... | A47J 37/07 126/25 A |
| 8,739,380 B1 * | 6/2014 | Montgomery | ............... | A47J 37/0704 29/401.1 |
| 8,893,704 B2 * | 11/2014 | Foster | ............... | A47J 37/0704 126/9 R |
| 9,101,244 B2 | 8/2015 | Samaras | | |
| 9,464,811 B2 * | 10/2016 | Coffman | ............... | F24B 1/202 |
| 9,635,979 B2 * | 5/2017 | Abrams | ............... | A47J 37/0713 |
| D813,589 S | 3/2018 | Graves | | |
| 10,051,997 B2 * | 8/2018 | Contarino, Jr. | ............... | A47J 37/0658 |
| 2009/0199839 A1 * | 8/2009 | Hulsey | ............... | A47J 37/07 126/25 A |
| 2013/0239823 A1 | 9/2013 | Re | | |
| 2014/0345594 A1 * | 11/2014 | Rhodes | ............... | A47J 37/0763 126/25 R |
| 2016/0235078 A1 | 8/2016 | Farina | | |

* cited by examiner

*Primary Examiner* — Alfred Basichas

(57) ABSTRACT

A modular smoker assembly includes a heat pot that is fillable with a combustible material to produce smoke for smoking food items when the combustible material is burned. A plurality of cooking pots is provided and respective ones of the cooking pots are stackable on top of each other for positioning on the heat pot. In this way each of the cooking pots is in fluid communication with the heat pot to receive the smoke for cooking. Food items are positionable in the cooking pots to cook the food item with the smoke. A lid bucket is positionable on top of a topmost one of the cooking pots when the cooking pots are stacked on the heat pot to retain heat in the cooking pots.

7 Claims, 6 Drawing Sheets

MODULAR SMOKER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to smoker devices and more particularly pertains to a new smoker device that has an adjustable height for smoking one or more food items.

(2) Description of Related Art Including Information Disclosed Under 37 CFR 1.97 and 1.98

The prior art relates to smoker devices. The prior art discloses a modular, vertically stackable cooking device that includes a water reservoir for boiling water. The prior art discloses a collapsible box for containing a combustible material and food items to be cooked. Additionally, the prior art discloses a modular grilling device that is laterally assembled as opposed to being vertically stacked. The prior art discloses a cooking grill insert for better cooking food items that are normally not cookable in a cooking grill. The prior art discloses a modular smoker that includes a plurality of cooking grills being pivotally coupled to a smoker housing.

BRIEF SUMMARY OF THE INVENTION

An embodiment of the disclosure meets the needs presented above by generally comprising a heat pot that is fillable with a combustible material to produce smoke for smoking food items when the combustible material is burned. A plurality of cooking pots is provided and respective ones of the cooking pots are stackable on top of each other for positioning on the heat pot. In this way each of the cooking pots is in fluid communication with the heat pot to receive the smoke for cooking. Food items are positionable in the cooking pots to cook the food item with the smoke. A lid bucket is positionable on top of a topmost one of the cooking pots when the cooking pots are stacked on the heat pot to retain heat in the cooking pots.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
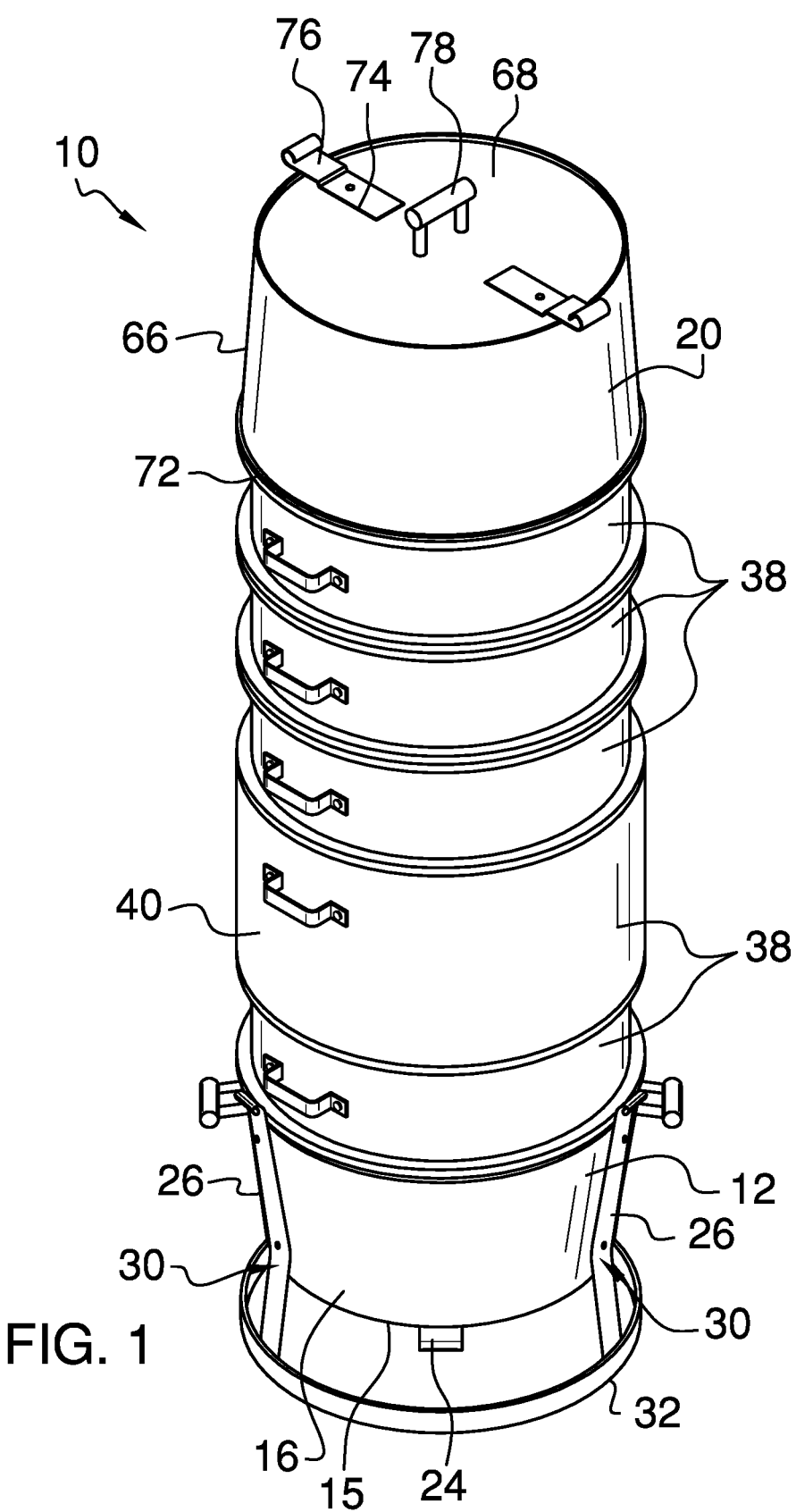
FIG. 1 is a perspective in-use view of a modular smoker assembly according to an embodiment of the disclosure.
Figure 2:
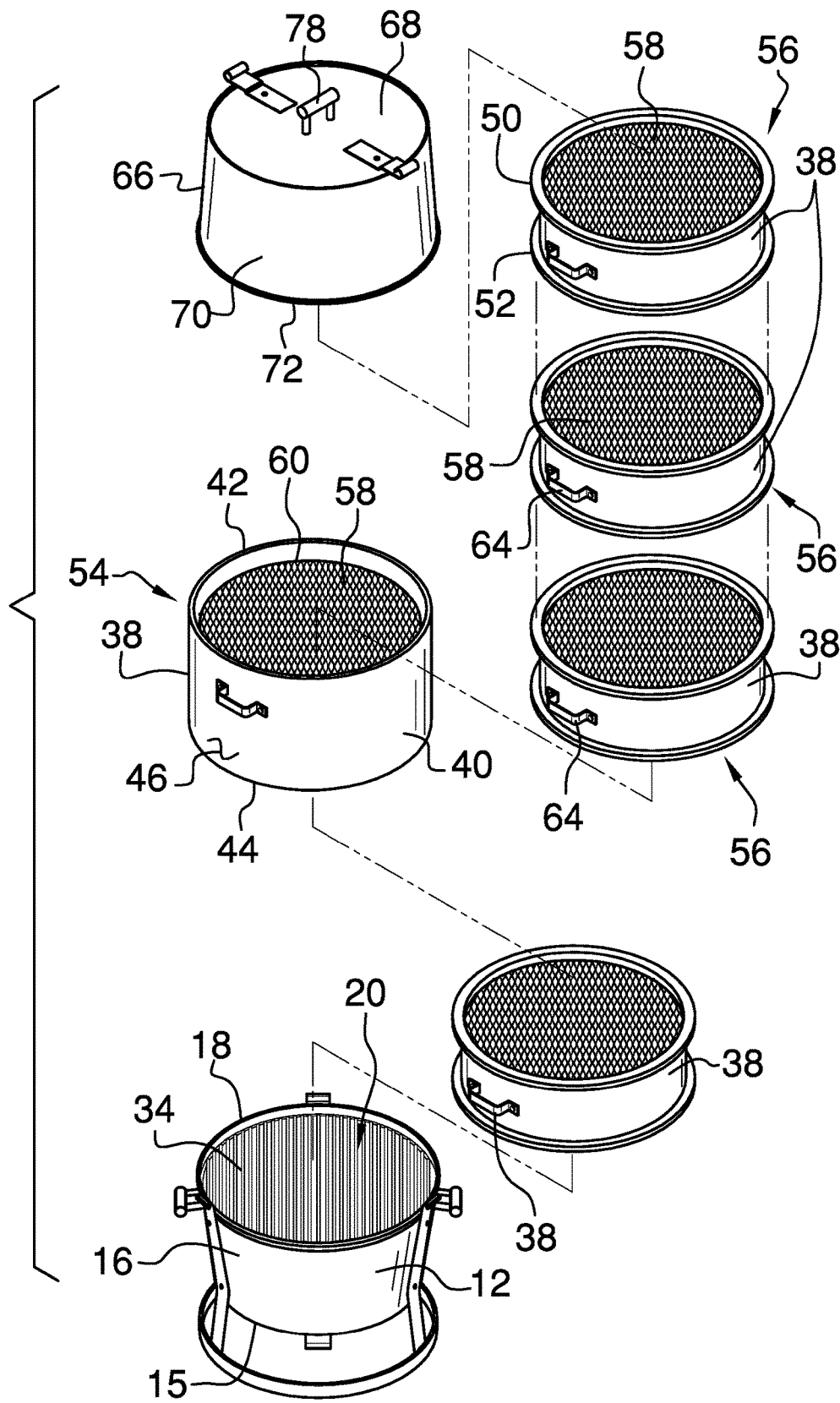
FIG. 2 is an exploded perspective view of an embodiment of the disclosure.
Figure 3:
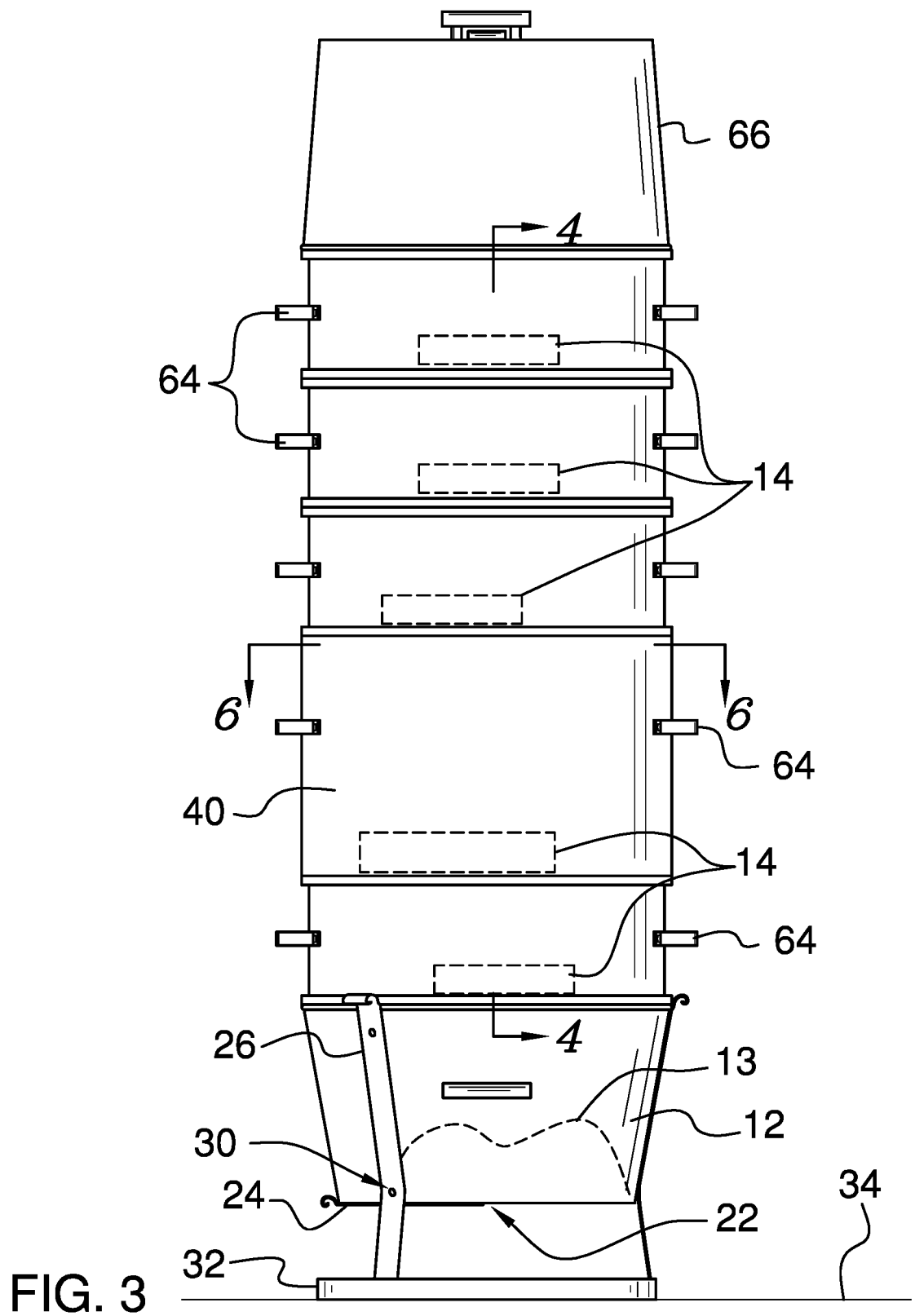
FIG. 3 is a front view of an embodiment of the disclosure.
Figure 4:
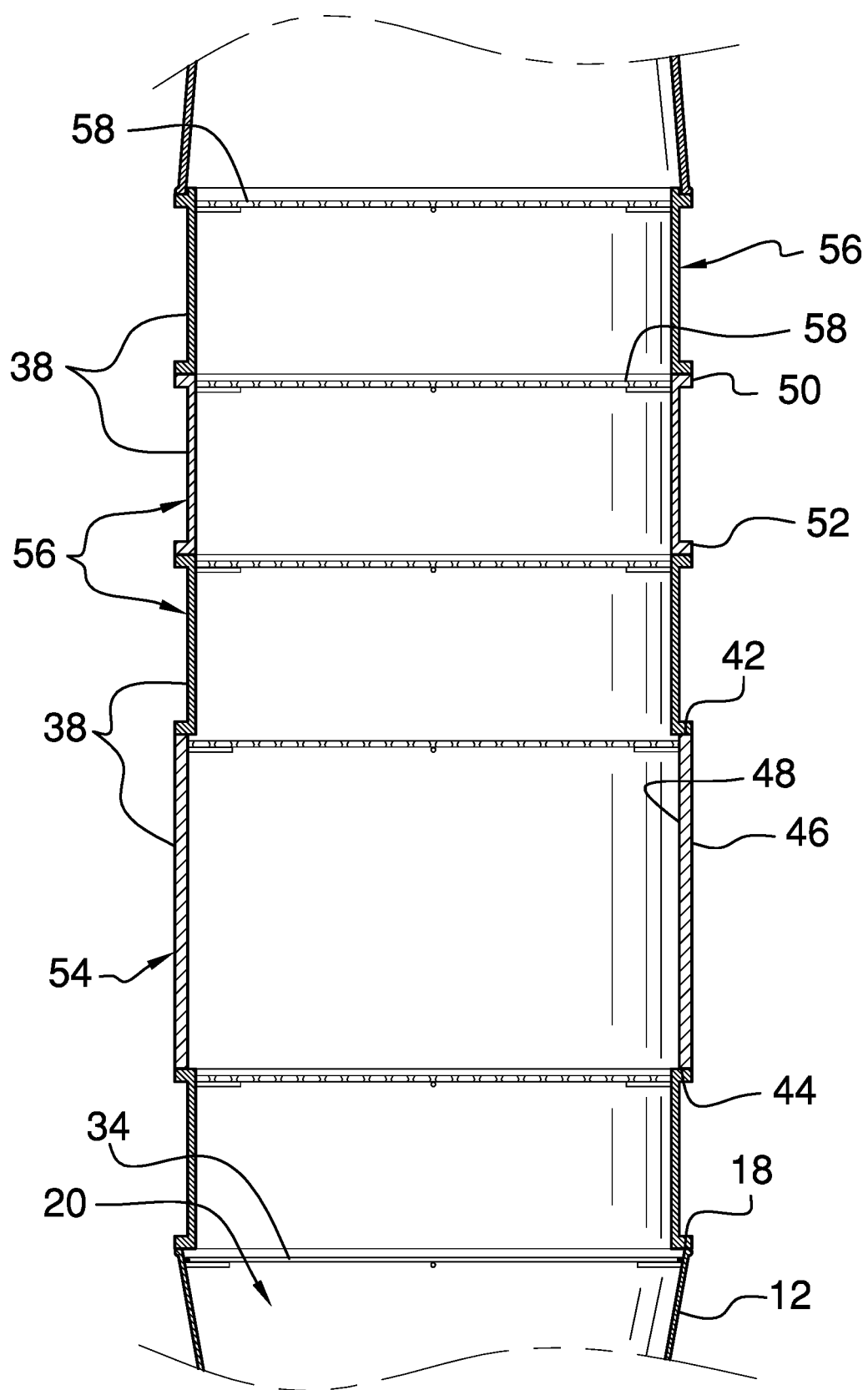
FIG. 4 is a cross sectional view taken along line 4-4 of FIG. 3 of an embodiment of the disclosure.
Figure 5:
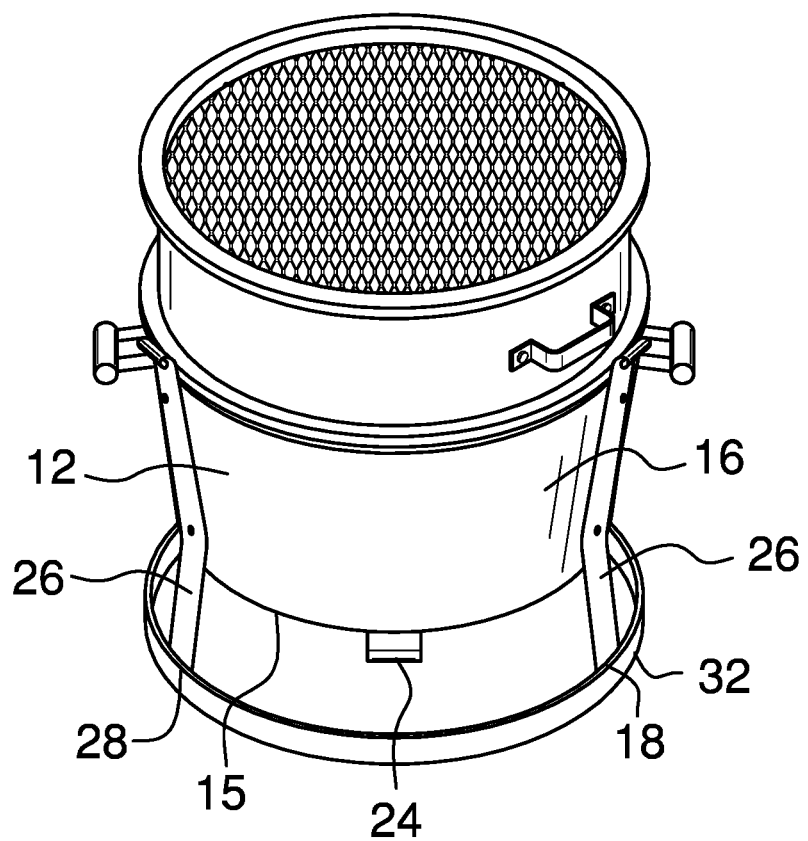
FIG. 5 is a top perspective view of an embodiment of the disclosure.
Figure 6:
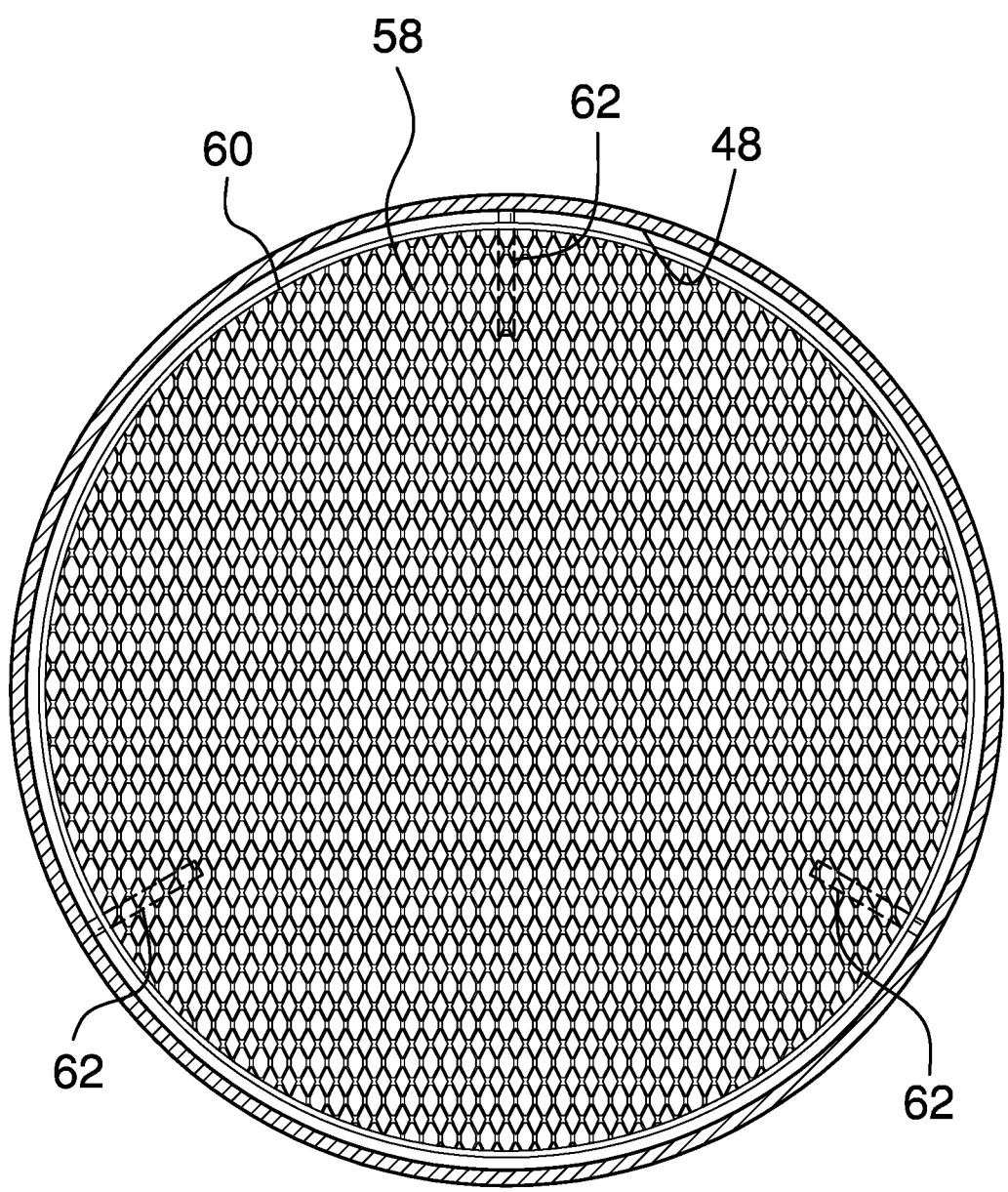
FIG. 6 is a cross sectional view taken along line 6-6 of FIG. 3 of an embodiment of the disclosure.

With reference now to the drawings, and in particular to FIGS. 1 through 6 thereof, a new smoker device embodying the principles and concepts of an embodiment of the disclosure and generally designated by the reference numeral 10 will be described.

As best illustrated in FIGS. 1 through 6, the modular smoker assembly 10 generally comprises a heat pot 12 that is fillable with a combustible material 13 to produce smoke for smoking food items 14 when the combustible material 13 is burned. The combustible material 13 may be wood chips, charcoal or any other material commonly burned for smoking food. The heat pot 12 has a bottom wall 15 and an outer wall 16 extending upwardly therefrom, and the outer wall 16 has a distal edge 18 with respect to the bottom wall 15 defining an opening 20 into the heat pot 12. The bottom wall 15 has an air opening 22 extending therethrough for passing air into the heat pot 12. An air damper 24 is slidably coupled to the bottom wall 15 of the heat pot 12 and the air damper 24 is aligned with the air opening 22 for opening or closing the air opening 22.

A plurality of legs 26 is each coupled to and extends downwardly away from the outer wall 16 of the heat pot 12. Each of the legs 26 has a distal end 28 with respect to the bottom wall 15 of the heat pot 12. As is most clearly shown in FIG. 3, the legs 26 may have a bend 30 thereon such that the distal end 28 of the legs 26 is aligned with the distal edge 18 of the outer wall 16 of the heat pot 12. A ring 32 is coupled to the distal end 28 of each of the legs 26 and the ring 32 rests on a support surface 34 thereby spacing the heat pot 12 above the support surface 34. The ring 32 restrains the distal end 28 of each of the legs 26 for enhancing the load bearing capacity of the legs 26.

A heat screen 36 is coupled to the heat pot 12 and the heat screen 36 is positioned to cover the opening in the heat pot 12. The heat screen 36 is spaced downwardly from the distal edge 18 of the outer wall 16 of the heat pot 12. The heat screen 36 is comprised of a heat resistant material such as steel or the like and the heat screen 36 is mesh material for passing air therethrough.

A plurality of cooking pots 38 is provided and respective ones of the cooking pots 38 are stackable on top of each other for positioning on the heat pot 12. In this way each of the cooking pots 38 is in fluid communication with the heat pot 12 to receive the smoke for smoking the food items 14. Each of the cooking pots 38 can have food items 14 positioned therein to cook the food items 14 with the smoke. Moreover, a desired number of cooking pots 38, corresponding to the number of different food items 14 to be cooked, are stacked upon each other. In this way one food item or a plurality of food items 14 can be smoked.

Each of the cooking pots 38 has an exterior wall 40 and the exterior wall 40 of each of the cooking pots 38 has a top edge 42, a bottom edge 44, an outer surface 46 and an inner surface 48. The exterior wall 40 of each of the cooking pots 38 has a top lip 50 thereon and a bottom lip 52 thereon. The top lip 50 is aligned with and is coextensive with the top edge 42 and the bottom lip 52 is aligned with and is coextensive with the bottom edge 44. Moreover, the bottom lip 52 on each cooking pot 38 rests on the top lip 50 of an adjacent cooking pot 38 when the cooking pots 38 are stacked on each other. The plurality of cooking pots 38 includes a tall cooking pot 54 and a set of short cooking pots 56; the exterior wall 40 of the tall cooking pot 54 has a height that is greater than the height of the exterior wall 40 of the short cooking pots 56.

A plurality of cooking screens 58 is included and each of the cooking screens 58 is positioned in a respective one of the cooking pots 38. In this way food items 14 can be positioned on each of the cooking screens 58 for smoking the foot items. Each of the cooking screens 58 has a perimeter edge 60 that is coupled to the inner surface 48 of the exterior wall 40 of the respective cooking pot. Additionally, each of the cooking screens 58 is spaced downwardly from the top edge 42 of the exterior wall 40 of the respective cooking pot 38. As is most clearly shown in FIG. 6, each of the cooking screens 58 may rest on supports 62 that are attached to the inner surface 48 of the exterior wall 40 of the respective cooking pot 38. A plurality of handles 64 is each coupled to a respective one of the cooking pots 38 and the heat pot 12 for carrying.

A lid bucket 66 is positionable on top of a topmost one of the cooking pots 38 when the cooking pots 38 are stacked on the heat pot 12 to retain heat in the cooking pots 38. The lid bucket 66 has a top wall 68 and an outside wall 70 extending downwardly therefrom. The outside wall 70 has a lower edge 72 and the lower edge 72 rests on the top lip 50 on the topmost cooking pot 67. The top wall 68 has an air opening 74 extending therethrough and the top wall 68 has an air damper 76 is slidably coupled thereto. The air damper 76 on the top wall 68 is aligned with the air opening 74 in the top wall 68 and a grip 78 is coupled to the top wall 68 of the lid bucket 66 for gripping.

In use, the combustible material 13 is placed in the heat pot 12 for burning. The food items 14 that a user wishes to smoke are positioned in the required number of cooking pots 38. The cooking pots 38 are subsequently stacked upon each other on the heat pot 12. In this way the smoke from the heat pot 12 passes upwardly through each of the cooking pots 38 for smoking the food items 14. Additionally, the lid bucket 66 is positioned on the topmost cooking pot 67 for retaining the heat and smoke in the cooking pots 38.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A modular smoker assembly being configured to be vertically stacked to a variety of heights for smoking one or more food items, said assembly comprising:

a heat pot being fillable with a combustible material wherein said heat pot is configured to produce smoke for smoking food items when the combustible material is burned;

a heat screen being coupled to said heat pot, said heat screen being positioned to cover said opening in said heat pot, said heat screen being spaced downwardly from said distal edge of said outer wall of said heat pot;

a plurality of cooking pots, respective ones of said cooking pots being stackable on top of each other for positioning on said heat pot thereby facilitating each of said cooking pots to be in fluid communication with said heat pot wherein said respective cooking pots are configured to receive the smoke for cooking, each of said cooking pots having a food item being positionable therein wherein each of said cooking pots is configured to cook the food item with the smoke;

a plurality of cooking screens, each of said cooking screens being positioned in a respective one of said cooking pots wherein each of said cooking screens is configured to have food items positioned thereon for smoking the foot items, each of said cooking screens having a perimeter edge being coupled to said inner surface of said exterior wall of said respective cooking pot, each of said cooking screens being spaced downwardly from said top edge of said exterior wall of said respective cooking pot;

a lid bucket being positionable on top of a topmost one of said cooking pots when said cooking pots are stacked on said heat pot wherein said lid bucket is configured to retain heat in said cooking pots;

said heat pot having a bottom wall parallel to a supporting surface an outer wall extending upwardly therefrom, said outer wall having a distal edge with respect to said bottom wall defining an opening into said heat pot, said bottom wall having an air opening extending therethrough for passing air into said heat pot; and an air damper being slidably coupled to said bottom wall of said pot, said air damper being aligned with said air opening for opening or closing said air opening.

2. The assembly according to claim 1, further comprising a plurality of legs, each of said legs being coupled to and extending downwardly away from said outer wall of said heat pot, each of said legs having a distal end with respect to said bottom wall of said heat pot.

3. The assembly according to claim 2, further comprising a ring being coupled to said distal end of each of said legs wherein said ring is configured to rest on a support surface thereby spacing said heat pot above the support surface, said ring restraining said distal end of each of said legs for enhancing the load bearing capacity of said legs.

4. The assembly according to claim 1, wherein each of said cooking pots has an exterior wall, said exterior wall of each of said cooking pots having a top edge, a bottom edge, an outer surface and an inner surface, said exterior wall of each of said cooking pots having a top lip thereon and a bottom lip thereon, said top lip being aligned with and being coextensive with said top edge, said bottom lip being aligned with and being coextensive with said bottom edge, said bottom lip on each cooking pots rests on said top lip of an adjacent cooking pot when said cooking pots are stacked on each other.

5. The assembly according to claim 4, wherein said plurality of cooking pots including a tall cooking pot and a set of short cooking pots, said exterior wall of said tall cooking pot having a height being greater than the height of said exterior wall of said short cooking pots.

6. The assembly according to claim 4, wherein said lid bucket has a top wall and an outside wall extending downwardly therefrom, said outside wall having a lower edge, said lower edge resting on said top lip on said topmost cooking pot, said top wall having an air opening extending therethrough, said top wall having an air damper being slidably coupled thereto, said air damper on said top wall being aligned with said air opening in said top wall.

7. A modular smoker assembly being configured to be vertically stacked to a variety of heights for smoking one or more food items, said assembly comprising:

a heat pot being fillable with a combustible material wherein said heat pot is configured to produce smoke for smoking food items when the combustible material is burned, said heat pot having a bottom wall parallel to a supporting surface an outer wall extending upwardly therefrom, said outer wall having a distal edge with respect to said bottom wall defining an opening into said heat pot, said bottom wall having an air opening extending therethrough for passing air into said heat pot;

an air damper being slidably coupled to said bottom wall of said pot, said air damper being aligned with said air opening for opening or closing said air opening;

a plurality of legs, each of said legs being coupled to and extending downwardly away from said outer wall of said heat pot, each of said legs having a distal end with respect to said bottom wall of said heat pot;

a ring being coupled to said distal end of each of said legs wherein said ring is configured to rest on a support surface thereby spacing said heat pot above the support surface, said ring restraining said distal end of each of said legs for enhancing the load bearing capacity of said legs;

a heat screen being coupled to said heat pot, said heat screen being positioned to cover said opening in said heat pot, said heat screen being spaced downwardly from said distal edge of said outer wall of said heat pot;

a plurality of cooking pots, respective ones of said cooking pots being stackable on top of each other for positioning on said heat pot thereby facilitating each of said cooking pots to be in fluid communication with said heat pot wherein said respective cooking pots are configured to receive the smoke for smoking the food items, each of said cooking pots having a food item being positionable therein wherein each of said cooking pots is configured to cook the food item with the smoke, each of said cooking pots having an exterior wall, said exterior wall of each of said cooking pots having a top edge, a bottom edge, an outer surface and an inner surface, said exterior wall of each of said cooking pots having a top lip thereon and a bottom lip thereon, said top lip being aligned with and being coextensive with said top edge, said bottom lip being aligned with and being coextensive with said bottom edge, said bottom lip on each cooking pot resting on said top lip of an adjacent cooking pot when said cooking pots are stacked on each other, said plurality of cooking pots including a tall cooking pot and a set of short cooking pots, said exterior wall of said tall cooking pot having a height being greater than the height of said exterior wall of said short cooking pots;

a plurality of cooking screens, each of said cooking screens being positioned in a respective one of said cooking pots wherein each of said cooking screens is configured to have food items positioned thereon for smoking the foot items, each of said cooking screens having a perimeter edge being coupled to said inner surface of said exterior wall of said respective cooking pot, each of said cooking screens being spaced downwardly from said top edge of said exterior wall of said respective cooking pot;

a plurality of handles, each of said handles being coupled to a respective one of said cooking pots and said smoking pot for carrying;

a lid bucket being positionable on top of a topmost one of said cooking pots when said cooking pots are stacked on said heat pot wherein said lid bucket is configured to retain heat in said cooking pots, said lid bucket having a top wall and an outside wall extending downwardly therefrom, said outside wall having a lower edge, said lower edge resting on said top lip on said topmost cooking pot, said top wall having an air opening extending therethrough, said top wall having an air damper being slidably coupled thereto, said air damper on said top wall being aligned with said air opening in said top wall; and a grip being coupled to said top wall of said lid bucket for gripping.

* * * * *